United States Patent
Bass et al.

(10) Patent No.: US 12,146,110 B2
(45) Date of Patent: *Nov. 19, 2024

(54) METHOD OF MANUFACTURING RENEWABLE DIESEL FROM BIOLOGICAL FEEDSTOCK

(71) Applicant: Green Carbon Development, LLC, Houston, TX (US)

(72) Inventors: Thomas Bass, Mandeville, LA (US); James Rolston, Friendswood, TX (US); Terry Sparkman, Beaumont, TX (US)

(73) Assignee: Green Carbon Development, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,691

(22) Filed: Aug. 24, 2023

(65) Prior Publication Data

US 2023/0407185 A1 Dec. 21, 2023

Related U.S. Application Data

(63) Continuation of application No. 17/856,707, filed on Jul. 1, 2022, now Pat. No. 11,773,332, which is a (Continued)

(51) Int. Cl.
*C10G 3/00* (2006.01)
*C11B 3/00* (2006.01)
(Continued)

(52) U.S. Cl.
CPC .............. *C10G 3/46* (2013.01); *C10G 3/50* (2013.01); *C11B 3/006* (2013.01); *C11C 1/04* (2013.01);
(Continued)

(58) Field of Classification Search
CPC .... C10G 3/46; C10G 3/50; C10G 2300/1011; C10G 2300/202; C10G 2300/4006;
(Continued)

(56) References Cited

U.S. PATENT DOCUMENTS 2,139,589 A * 12/1938 Ittner .................. C11C 1/04
554/160
2013/0310620 A1* 11/2013 Kalnes .................. C10G 3/47
585/733

* cited by examiner

*Primary Examiner* — In Suk C Bullock
*Assistant Examiner* — Jason Y Chong
(74) *Attorney, Agent, or Firm* — Conley Rose, P.C.

(57) ABSTRACT

A method for producing renewable diesel includes introducing a primary feedstock comprising biologically-derived triglycerides with catalyst poisons into a first reaction chamber and hydrolyzing the primary feedstock within the first reaction and liquid-liquid extraction chamber for at least an hour such that the reacted triglycerides are separated into an aqueous solution comprising glycerol and catalyst poisons, and an intermediate feedstock comprising free fatty acids and catalyst poisons. The method also includes distilling the intermediate feedstock to separate the intermediate feedstock into a purified intermediate stream and a lower volume bottom stream containing unreacted triglyceride, diglyceride, monoglyceride, FFA and catalyst poisons. The method also includes combining the purified intermediate feedstock with a hydrogen stream and converting, in a second reaction chamber comprising a metallic catalyst bed, the purified intermediate feedstock into a product comprising long-chain alkanes. The method also includes hydrotreating the purified intermediate feedstock into a renewable diesel product.

20 Claims, 3 Drawing Sheets

Related U.S. Application Data continuation-in-part of application No. 17/557,329, filed on Dec. 21, 2021, now Pat. No. 11,718,795.

(60) Provisional application No. 63/282,804, filed on Nov. 24, 2021, provisional application No. 63/128,526, filed on Dec. 21, 2020.

(51) Int. Cl.
*C11C 1/04* (2006.01)
*C11C 1/10* (2006.01)
*C11C 3/12* (2006.01)

(52) U.S. Cl.
CPC .................. *C11C 1/10* (2013.01); *C11C 3/12* (2013.01); *C10G 2300/1011* (2013.01); *C10G 2300/202* (2013.01); *C10G 2300/4006* (2013.01); *C10G 2300/4081* (2013.01); *C10G 2300/708* (2013.01); *C10G 2400/04* (2013.01)

(58) Field of Classification Search
CPC ...... C10G 2300/4081; C10G 2300/708; C10G 2400/04; C11B 3/006; C11C 1/04; C11C 1/10; C11C 3/12; C11C 3/123; Y02P 30/20

See application file for complete search history.

METHOD OF MANUFACTURING RENEWABLE DIESEL FROM BIOLOGICAL FEEDSTOCK

CROSS-REFERENCE TO RELATED APPLICATIONS

This application is a continuation of U.S. non-provisional patent application Ser. No. 17/856,707 filed Jul. 1, 2022, entitled "Method of Manufacturing Renewable Diesel from Biological Feedstock," which is a continuation-in-part of U.S. non-provisional patent application Ser. No. 17/557,329 filed Dec. 21, 2021, entitled "Method of Manufacturing Renewable Diesel From Biological Feedstock," now U.S. Pat. No. 11,718,795 issued Aug. 8, 2023, which claims benefit of U.S. provisional patent application No. 63/282,804 filed Nov. 24, 2021, entitled "Method of Manufacturing Renewable Diesel From Biological Feedstock," and provisional patent application No. 63/128,526 filed Dec. 21, 2020, entitled "Method of Manufacturing Renewable Diesel From Biological Feedstock," each of which is incorporated herein by reference in its entirety.

FIELD

Embodiments usable within the scope of the present disclosure relate, generally, to a novel method of synthesizing renewable diesel from natural triglycerides contained in plant oils and animal fats.

BACKGROUND

Renewable diesel is a biologically-derived method of synthesizing chemically equivalent hydrocarbon products (e.g., C10-C18 alkanes, naphtha) from present day biological sources such as animal fats. Unlike blended formulations such as bio-diesel, renewable diesel can fully substitute for petroleum-based hydrocarbons after the point of refinement.

Currently, renewable diesel manufacturing relies on the use of various catalysts for converting the triglycerides into usable fuel. Examples of common catalysts include oxides of Group I and Group II metals for ketonization, and Group VIa and Group VIII metals for deoxygenation. These catalysts are in turn vulnerable to various "catalyst poisons" commonly present in the triglycerides, which will inhibit the desired catalysis reactions. Examples of common catalyst poisons include sulfur, nitrogen and phosphorous.

In order to eliminate these catalyst poisons, triglycerides are subjected to a pre-treatment before use as a feedstock. The traditional pre-treatment step involves bleaching earth to remove catalyst poisons. This step adds expense due to the mining and use of large volumes of earthen clay material, and subsequent disposal of those materials once those catalyst poisons have been removed. The process also results in a significant (2-5 wt %) net loss of feedstock through absorption, which reduces the economy of renewable diesel compared to standard hydrocarbons.

In addition, once the triglycerides are treated, the standard renewable diesel process of decarboxylation produces two undesirable byproducts: propane and $CO_2$, which are of low value compared to the long-chain hydrocarbons and are usually used as a fuel within the manufacturing process or discarded, which further reduces the economy of renewable diesel, as such waste products must be disposed of and obviate the environmental benefits of renewable diesel.

Examples (all of which listed are incorporated by reference) of such known renewable diesel processes include U.S. Pat. No. 7,511,181 to Petri and U.S. Pat. No. 8,912,375 to Egeberg. These processes involve the use of a biological feedstock which is subsequently reacted to produce renewable diesel through competing reaction mechanisms of hydrogenation and decarboxylation. Both reaction mechanisms for renewable diesel produce propane, while decarboxylation also generates CO and $CO_2$, thereby generating low-value waste products, and in which the feedstock is pre-treated to remove the catalyst poisons. Additionally, in Petri, the catalyst poisons are removed by ion exchange directly to the feedstock upstream of the hydrogenation/decarboxylation steps.

Another example of renewable diesel is U.S. Pat. No. 7,967,973 to Myllyoja, in which a triglyceride is subjected to a three-step process involving ketonization, hydrodeoxygenation, and hydroisomerization. While differing from the Petri and Egeberg processes in several respects, this merely moves the decarboxylation to an earlier step, as the ketonization step still produces carbon dioxide as a waste product.

Still another example is U.S. Pat. No. 8,350,102 to Roberts, in which a hydrolysis reaction coverts the triglyceride to an intermediate free fatty acid (FFA) feedstock and glycerol by product to be dehydrated and then used as a fuel source. However like Myllyoja, the Roberts process simply moves the decarboxylation process, in this case, to a later step where FFAs are catalytically decarboxylated and "cracked" to smaller hydrocarbons in a high-temperature setting.

Still another example is U.S. Pat. No. 10,071,322 to Coppola, in which a single-step high-temperature, high-pressure, high-turbulence hydrolysis reaction is utilized to convert triglycerides into a combination of FFAs and glycerol, which can then be utilized in the production of renewable fuels. However, the yield percentages (and concomitant economic benefits) of both products are limited by the high reaction energy required with reaction occurring above the 290° C. glycerol decomposition temperature and the short residence time, and Coppola does not disclose a particular method for converting the FFAs into renewable diesel. Additionally, with boiling points of 361° C. for stearic acid, oleic acid 360° C., linoleic acid 230° C. (all C18 FFAs) and 351° C. for Palmitic acid, the distillation temperature of greater than 400° C. suggests distillation above atmospheric pressure.

Still another example is US 2021/0047575 A1 to Zarli, in which the traditional prior art hydrolysis reaction is utilized to convert triglycerides into a combination of FFAs and glycerol. The resulting FFAs are separated, then treated using an acid esterification step that enables the elimination of the catalyst poisons in the FFAs directly from the hydrolysis reaction through the aqueous phase discharge stream. This contrasts from the presently disclosed subject matter where distillation is first used to extract catalyst poisons and other impurities such as packaging materials from the feedstock stream before applying traditional non-esterification processes to a low-volume recycle stream.

A need therefore exists for a renewable diesel synthesis process which utilizes a pathway in which none of the intermediate products are decarboxylated or otherwise subject to a reaction which liberates carbon, thereby minimizing the production of undesirable waste products. A need also exists for providing more economical yields without feedstock losses incurred by the methods used to pre-treat and eliminate catalyst poisons. A need also exists for a simple process which generates by-products at high efficiency and further improves the economy of the renewable diesel process.

Embodiments of the presently disclosed subject matter described herein meet this and other needs.

SUMMARY

Broadly speaking, the presently-disclosed subject matter relates to a two-step process utilizing a triglyceride feedstock derived from biological sources. The first step involves hydrolysis of the triglycerides while executing liquid-liquid extraction of catalyst poisons into the aqueous fraction within the hydrolysis reactor chamber. Two streams exit the reactor chamber, specifically including an intermediate feedstock comprising a mixture of free fatty acids (FFA) as a first stream and a second stream comprising glycerol. The glycerol present in the second stream can be purified by simple distillation, for example, to form a by-product that is both more valuable and less hazardous than either propane or $CO_2$. The first stream comprising the FFA can then be further processed in a simple distillation step to produce a stream free of catalyst poisons, other impurities and utilized as feedstock for hydrotreatment in a renewable diesel production process. The remaining catalyst poisons not removed by liquid-liquid extraction in the hydrolysis reactor are later removed from the pre-treatment process by utilizing known processes such ion exchange, activated carbon, solvent extraction, centrifugation, chromatography, electrodeionization, zeolites, etc. in a low volume recycle stream. Significantly, by converting the initial triglyceride feedstock to an FFA feedstock, the need to hydrotreat at typical high temperature that promote the decarboxylation reaction is obviated, thereby drastically reducing the production of $CO_2$, and in the process generating a significantly higher proportion of saturated, long chain C14, C16 or C18 hydrocarbons, as opposed to lower carbon content hydrocarbons. Additionally, carbon yield losses in the form of propane are avoided and the more valuable glycerol product is secured.

In an embodiment, a method for producing renewable diesel may comprise heating and pressurizing a first reaction chamber to a temperature between 250° C. and 270° C. and a pressure between 700-900 psig. The method may also comprise introducing a primary feedstock comprising biologically-derived triglycerides with catalyst poisons at bottom of first reaction chamber to initiate a hydrolysis reaction. The method may also comprise hydrolyzing the primary feedstock within the first reaction and liquid-liquid extraction chamber for at least an hour such that the reacted triglycerides are separated into an aqueous solution comprising glycerol and catalyst poisons, and an intermediate feedstock comprising free fatty acids and catalyst poisons. The method may also comprise conveying the intermediate feedstock from the first reaction and liquid-liquid extraction chamber to a distillation column, and conveying the remaining aqueous solution into an evaporation system. The method may also comprise distilling the intermediate feedstock at a pressure under 700 mm Hg to separate the intermediate feedstock into a purified intermediate stream and a lower volume bottom stream containing unreacted triglyceride, diglyceride, monoglyceride, FFA and catalyst poisons. The method may also comprise combining the purified intermediate feedstock with a hydrogen stream. The method may also comprise conveying the intermediate feedstock and hydrogen stream to a second reaction chamber comprising a metallic catalyst bed to initiate a hydrogenation reaction converting the intermediate feedstock into a product comprising long-chain alkanes. The method may also comprise hydrotreating the intermediate feedstock into a renewable diesel product by heating the second reaction chamber to a temperature between about 200° C. and about 350° C. and pressurized to between 300 psig and 1000 psig while passing through the second reaction chamber.

Additionally or alternatively, in an embodiment, a method for producing renewable diesel may comprise introducing a primary feedstock comprising biologically-derived triglycerides with catalyst poisons into a counter-current hydrolysis reactor. The method may also comprise hydrolyzing the primary feedstock within the counter-current hydrolysis reactor at a temperature from about 250° C. to about 270° C. and a pressure from about 700 psig to about 900 psig for at least an hour to yield a non-aqueous fraction. comprising catalyst poisons and free fatty acids resulting from hydrolysis of the triglycerides. The method may also comprise extracting, via liquid-liquid extraction with an aqueous fraction, at least a portion of the catalyst poisons from the non-aqueous fraction within the counter-current hydrolysis reactor. The method may also comprise separating the aqueous fraction from the non-aqueous phase. The aqueous phase may comprise glycerol and catalyst poisons. The method may also comprise removing an intermediate feedstock from the counter-current reaction chamber. The intermediate feedstock may comprise at least a portion of the non-aqueous phase. The method may also comprise distilling the intermediate feedstock at a pressure not more than 700 mm Hg to separate the intermediate feedstock into a purified intermediate stream and a low-volume bottom stream comprising unreacted triglyceride, diglyceride, monoglyceride, catalyst poisons, and free fatty acids. The method may also comprise hydrotreating the intermediate feedstock at a temperature from about 200° C. to about 350° C. and a pressure from about 300 psig to about 1000 psig in the presence of hydrogen within a reaction chamber having a metallic catalyst bed to form the renewable diesel.

Additionally or alternatively, in an embodiment, a method for producing renewable diesel may comprise introducing a primary feedstock comprising biologically-derived triglycerides with catalyst poisons into a counter-current hydrolysis reactor comprising a plurality of stages. The method may also comprise contacting the primary feedstock with an aqueous fraction within the counter-current hydrolysis reactor under conditions sufficient to yield a non-aqueous fraction comprising catalyst poisons and free fatty acids resulting from hydrolysis of the triglycerides and under conditions sufficient to cause extraction, via liquid-liquid extraction with the aqueous fraction, at least a portion of the catalyst poisons from the non-aqueous fraction into the aqueous fraction. The method may also comprise separating the aqueous fraction from the non-aqueous phase. The method may also comprise removing an intermediate feedstock from the counter-current reaction chamber, wherein the intermediate feedstock comprises at least a portion of the non-aqueous phase. The method may also comprise providing the intermediate feedstock for production of the renewable diesel.

BRIEF DESCRIPTION OF THE DRAWINGS

In the detailed description of the embodiments, presented below, reference is made to the accompanying drawings.

One or more embodiments are described below with reference to the listed Figures.

DETAILED DESCRIPTIONS OF THE EMBODIMENTS

Before describing selected embodiments of the present disclosure in detail, it is to be understood that the presently disclosed subject matter is not limited to the particular embodiments described herein. The disclosure and description herein is illustrative and explanatory of one or more presently preferred embodiments and variations thereof, and it will be appreciated by those skilled in the art that various changes in the design, organization, order of operation, equipment structures and location, methodology, and use of mechanical equivalents may be made without departing from the spirit of the disclosure.

As well, it should be understood the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the disclosure.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
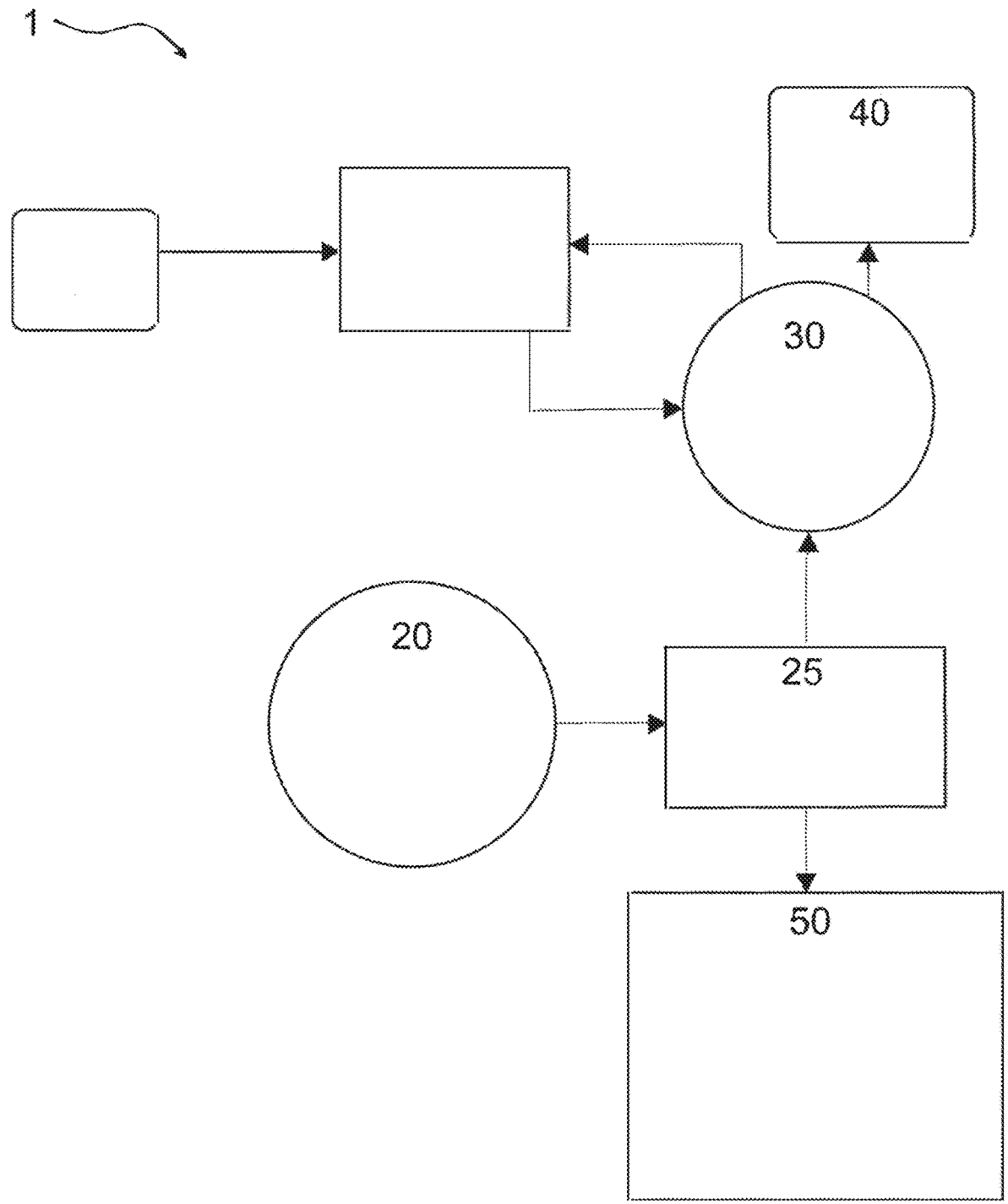
FIG. 1 depicts a standard renewable diesel synthesis process according to the prior art.

Turning first to FIG. 1, a flowchart depicting a typical renewable diesel process 1 is shown. The initial feedstock of triglycerides 20, derived from animal fat or vegetable oil, is pre-treated 25 with a bleaching clay to remove the catalyst poisons with a portion of the triglyceride (2-5%) lost as waste 50, followed by a renewable diesel process 30. The renewable diesel process utilizes a combination of hydrogenation and decarboxylation along with isomerization and refining, which yields renewable diesel and naphtha 40 as well as propane and $CO_2$ and waste products. In addition to $CO_2$, the decarboxylation also results in shorter-chain hydrocarbons in the final product due to the loss of carbon during the generation of CO and $CO_2$.

Figure 2:
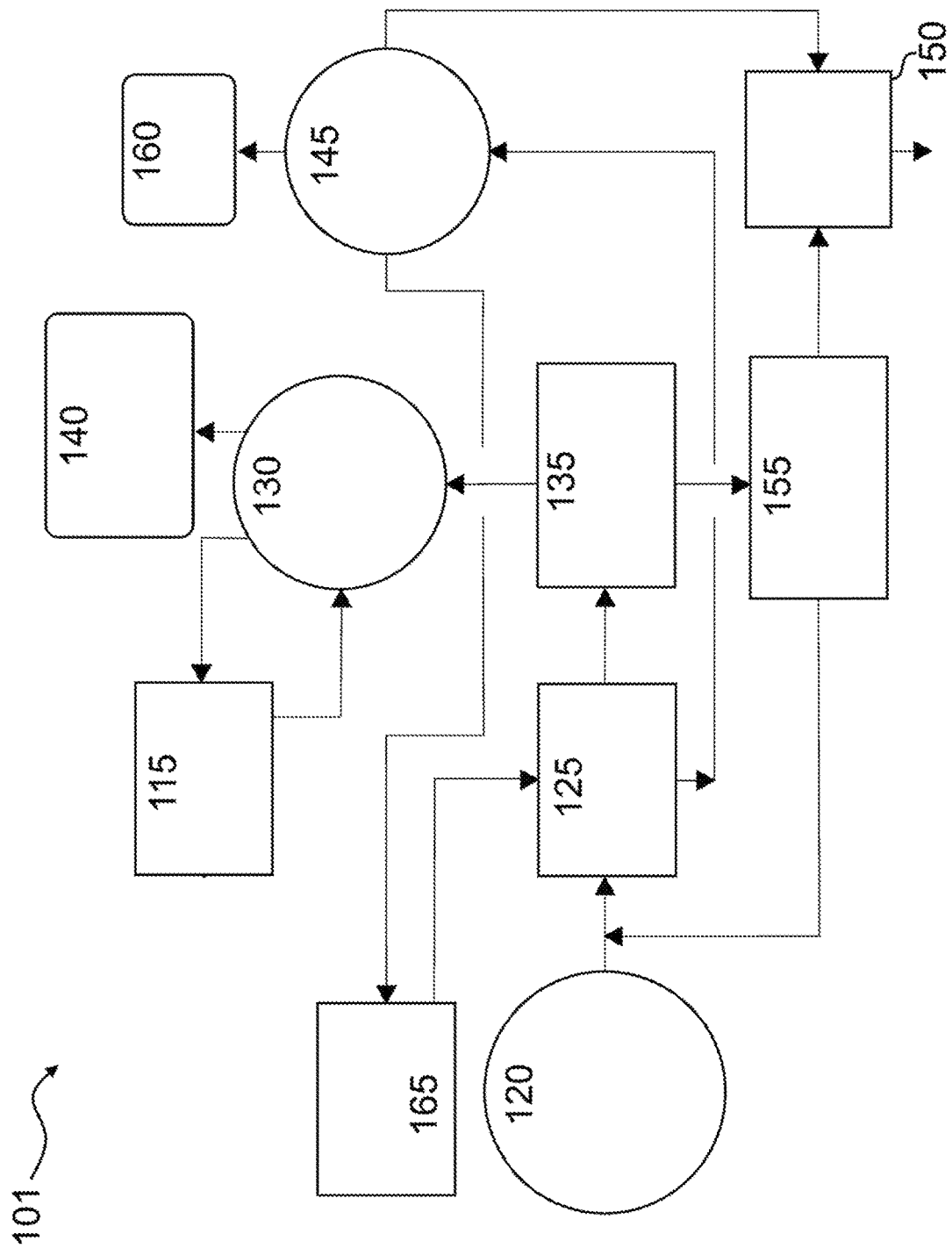
FIG. 2 depicts an embodiment of the novel process disclosed herein.

Turning to FIG. 2, an embodiment of a flow diagram of the disclosed renewable diesel process 101 is depicted. In the embodiment of FIG. 2, a triglyceride 120 is subjected to a hydrolysis reaction 125 in which the triglyceride 120 is hydrolyzed with water 165, for instance, from about 37% to about 50% water 165 by weight of the triglyceride 120. The hydrolysis reaction 125 may be carried out in a counter-current hydrolysis reactor. As shown in FIG. 2, a triglyceride feedstock is introduced at the bottom of the counter-current hydrolysis reactor under conditions at which the water, or substantially all of the water, within the counter-current hydrolysis reactor is maintained within a liquid phase, referred to as "sub-critical conditions." For example, the counter-current hydrolysis reactor may be maintained at a pressure from about 700 psig to about 900 psig and temperature from about 250° C. to about 270° C., (i.e.—below the decomposition point of glycerol).

Generally, in operation, the triglyceride 120 may be introduced into the counter-current hydrolysis reactor at a first end of the counter-current hydrolysis reactor and the water 165 may be introduced into the counter-current hydrolysis reactor at a second end thereof, generally opposite the first end. Although, in various embodiment, reference may be made to introduction of one or more reactants at a particular location (e.g., "top" or "bottom") such references are intended to serve as examples and, as such, any suitable configuration maybe employed in additional or alternative embodiments.

Hydrolysis of the triglyceride 120 may yield diglycerides, monoglycerides, and FFA(s), for example, depending upon how fully the triglyceride 120 is reacted. As such, the hydrolysis reaction 125 may yield a non-aqueous fraction, for example, including any remaining (e.g., unreacted) triglyceride 120 and any diglycerides, monoglycerides, and FFA(s).

Also within the counter-current hydrolysis reactor (for example, concurrent or substantially concurrent with the hydrolysis reaction 125), one or more chemical species present within the non-aqueous fraction may be extracted into the aqueous fraction, for example, via a liquid-liquid extraction process. For example, the aqueous fraction may function as an extracting liquid, for example, such that a chemical species present within the non-aqueous fraction is extracted into the aqueous fraction such that the chemical species may be removed as a part of the aqueous fraction.

Additionally, the counter-current hydrolysis reactor may be configured to cause the aqueous fraction to perform as an extracting liquid. For example, the counter-current hydrolysis reactor may comprise various internal components and/or configurations effective to configure the counter-current hydrolysis reactor to facilitate phase contacting (e.g., enhanced contact between the aqueous and non-aqueous fractions) so as to cause and/or enhance liquid-liquid extraction.

For example, the counter-current hydrolysis reactor may comprise various internal components effective to yield a high contacting surface area per volume of the reactor, for example, a contacting surface area per volume of the counter-current hydrolysis reaction of not less than about 50 $m^2/m^3$, additionally or alternatively, at least than about 100 $m^2/m^3$, additionally or alternatively, at least than about 150 $m^2/m^3$, additionally or alternatively, at least about 200 $m^2/m^3$, additionally or alternatively, at least about 250 $m^2/m^3$, additionally or alternatively, at least about 300 $m^2/m^3$, additionally or alternatively, from about 100 $m^2/m^3$ to about 400 $m^2/m^3$, additionally or alternatively, from about 150 $m^2/m^3$ to about 300 $m^2/m^3$.

Additionally or alternatively, the counter-current hydrolysis reactor may be characterized as having internal components effective to yield a high voidage. For instance, the counter-current hydrolysis reactor may comprise internals exhibiting at least about 90% voidage, additionally or alternatively, at least about 91% voidage, additionally or alternatively, at least about 92% voidage, additionally or alternatively, at least about 93% voidage, additionally or alternatively, at least about 94% voidage, additionally or alternatively, at least about 95% voidage.

Not intending to be bound by theory, the counter-current hydrolysis reactor as disclosed herein, for instance, a counter-current hydrolysis reactor having internal components effective to yield a high contacting surface area and/or a high voidage, may be effective to achieve efficient conversion of the triglyceride feedstock to FFA and, concurrent or substantially concurrent with the conversion of triglyceride to FFA, to achieve counter-current fluid flow within the reaction chamber so as to yield extraction of one or more chemical species. More particularly, the counter-current hydrolysis reactor as disclosed herein may be particularly effective to yield enhanced contacting between the aqueous and non-aqueous fractions so as to achieve efficient extraction of the common catalyst poisons originally in the triglyceride feedstock into the aqueous fraction.

Additionally or alternatively, the counter-current hydrolysis reactor may be configured to subject the aqueous and non-aqueous fractions to multiple iterations of mixing, liquid-liquid extraction, and separation, for example, in multiple stages. For example, in various embodiments, the counter-current hydrolysis reactor may include 2, 3, 4, 5, 6, 7, 8, 9, 10, 11, 12, or more stages. Herein, references to an "earlier," "upstream," or "preceding" stage refers to a stage that is, relative to another stage, closer to the end of the counter-current hydrolysis reactor at which the triglyceride 120 is introduced; likewise, references to a "later," "downstream," or subsequent stage refers to a stage that is, relative to another stage, closer to the end of the counter-current hydrolysis reactor at which the water 165 is introduced. Generally, the triglyceride 120 may be introduced at an upstream stage of the counter-current hydrolysis reactor and may progress toward later stages. Also, generally, the water 165 may be introduced at a downstream stage and may progress toward earlier stages. Generally, each stage may comprise a separate physical space from any other stage, for instance, such that fluids are only communicated between stages in a controlled manner.

In each stage, the non-aqueous fraction, for example, including the triglyceride 120 and any diglycerides, monoglycerides, and FFA(s) (e.g., resulting from hydrolysis of the triglyceride) may be mixed with the aqueous fraction, for example, water and any glycerol resulting from hydrolysis of the triglyceride, under conditions sufficient to yield hydrolysis of the triglyceride and liquid-liquid extraction of catalyst poisons present in the non-aqueous fraction by the aqueous fraction, as disclosed herein. For example, the triglyceride 120 (e.g., tallow) may be fed into the counter-current hydrolysis reactor at a first, relatively most upstream stage. Within the first reactor stage, the triglyceride 120 is mixed with the aqueous fraction also present within the first stage under conditions sufficient to cause hydrolysis of at least a portion of the triglyceride 120, for example, forming glycerol, FFAs, monoglycerides, and diglycerides. The glycerol may be present within the aqueous fraction and the FFAs, monoglycerides, and diglycerides may be present in the non-aqueous fraction. Additionally and as disclosed herein, concurrent or substantially concurrent with the hydrolysis within each stage, the aqueous fraction may operate as an extracting liquid, such that one or more chemical species, particularly, catalyst poisons, are extracted from the non-aqueous fraction into the aqueous fraction.

Also within each stage, the aqueous fraction (e.g., water and any glycerol) and the non-aqueous fraction (e.g., triglyceride and any FFAs, monoglycerides, and diglycerides) may be separated. For example, the non-aqueous fraction may be separated from the aqueous fraction. When separated, the aqueous fraction may be communicated to an earlier or relatively upstream stage (or, ultimately, out of the counter-current hydrolysis reactor from the most upstream stage) and the non-aqueous fraction may be communicated to a later or relatively downstream stage (or, ultimately, out of the counter-current reactor from the most downstream stage).

For example, in this manner, the non-aqueous fraction is repeatedly subjected to hydrolysis to hydrolyze the triglyceride, diglyceride, or monoglyceride and thereby form FFAs, which are then contacted with an extracting solvent, for example, the aqueous fraction, so as to wash impurities including catalyst poisons from the non-aqueous fraction. As such, the non-aqueous fraction (e.g., FFAs and any remaining monoglycerides, diglycerides, and triglycerides) in the furthest downstream stage is contacted with the aqueous fraction (e.g., water) having the least amount of impurities, consequently this keeps the concentration gradient relatively high so as to drive the diffusion/extraction equilibrium. Likewise, the aqueous fraction (e.g., water, also referred to a "sweet water" when glycerol is present) having the highest amount of impurities is contacted with the fresh non-aqueous fraction having the most impurities and, as such, the concentration gradient remains relatively high so as to drive the diffusion/extraction equilibrium.

Therefore, the hydrolysis reaction within the counter-current hydrolysis reactor yields the clean and efficient separation of the glycerol and water mixture from the fatty acid chains.

Additionally, the concurrent hydrolysis of the triglyceride feedstock and extraction of catalyst poisons, via the aqueous fraction present within the counter-current hydrolysis reactor, may be particularly efficient with respect to the extraction of catalyst poisons. For example, and again not intending to be bound by theory, hydrolysis of the triglyceride, for example, converting at least a portion of the triglyceride to FFA, may relieve steric hindrance(s) around the catalyst poisons, such as may have been due to the presence of the glyceride backbone, enabling easier access to the catalyst poisons by the aqueous fraction. The concurrent hydrolysis of the triglyceride feedstock and extraction of catalyst poison may enable removal of at least about 50%, by weight, of the catalyst poisons originally in the triglyceride feedstock, additionally or alternatively, at least about 55%, by weight, of the catalyst poisons originally in the triglyceride feedstock, or additionally or alternatively, at least about 60%, by weight, of the catalyst poisons originally in the triglyceride feedstock.

The counter-current hydrolysis reactor may be operated such that the triglyceride 120 has a residence time, within the counter-current hydrolysis reactor, of at least about 60 minutes, additionally or alternatively, at least about 75 minutes, additionally or alternatively, at least about 90 minutes, additionally or alternatively, at least about 120 minutes.

Advantageously, and as disclosed herein, this counter-current hydrolysis reactor, for example, internal components yielding a high contacting surface area per volume of the reactor, for example, of at least 150 $m^2/m^3$, additionally or alternatively, at least 200 $m^2/m^3$, may facilitate enhanced contacting for efficient extraction of the common catalyst poisons being dissolved originally in the triglyceride feedstock. Additionally or alternatively, a high voidage of the internal components within the counter-current hydrolysis reactor, for example, achieve at least 93% voidage in the reactor chamber, for example, at least 95% voidage in the reactor chamber, may be effective to achieve counter-current fluid flow within the reaction chamber to achieve efficient extraction of catalyst poisons and efficient conversion of the triglyceride feedstock to FFA feedstock within the counter-current hydrolysis reactor. As also disclosed herein, the extraction efficiency may be further enhanced by the conversion of triglyceride to FFA so as to relieve the steric hindrance around the catalyst poisons (in the form of the glyceride backbone), enabling easier access of the aqueous fraction to the catalyst poisons. For example, and not intending to be bound by theory, by hydrolyzing the triglyceride, thereby breaking the glyceride backbone of the triglyceride, the resulting FFAs are relieved of steric hindrance (facilitated by the glyceride backbone), enabling easier access to the catalyst poisons for migration into the aqueous fraction (e.g., the water and glycerol mixture). Advantageously, this counter-current hydrolysis process, particularly, the hydrolysis of triglycerides using a counter-current hydrolysis reactor of the type disclosed herein, is effective to cause most (e.g., at least about 50%, or more particularly, from about 50% to about 60%) of the common catalyst poisons originally present within the triglyceride 120 being removed within the aqueous fraction.

Additionally, and again not intending to be bound by theory, hydrolyzing the triglyceride, thereby breaking the glyceride backbone of the triglyceride, changes the functional group(s) of the glyceride backbone to a carboxylic acid having greater solubility in water and, as such, greater affinity for the aqueous fraction. Likewise, with respect to the FFA, the affinity toward the aqueous fraction is minimized due to the long alkane backbone, meaning that relatively little of the FFAs are lost to the aqueous fraction. Many organic phospholipids do not have a long carbon straight chain backbone. Also, the hydrolysis is effective to increase the mass transfer rate by reducing the overall molecular weight of the FFA, which is effective to improve the rate and equilibrium of removal.

Utilizing simple distillation at under 700 mm Hg of the FFA coming out of the hydrolysis process to generate an FFA distillate free of catalyst poisons, the expensive pretreatment process is rendered unnecessary while providing similar downstream benefits in the form of lower hydrotreating temperatures with the effect of reduced catalyst fouling.

Additionally, the subcritical reaction and resulting immiscibility of the FFAs with the aqueous solution of glycerol and a large portion of catalyst poisons and impurities which permits the two streams exiting the reactor chamber are immiscible in each other and essentially 'phase pure' and void of components from the other stream. The aqueous fraction of the product can thereafter be subjected to simple distillation to separate glycerol from the water and catalyst poisons.

The bottoms from the distillation of the FFA form a low volume stream (5-15% of FFA distillate) containing triglyceride, diglyceride, monoglyceride, FFA and the remaining catalyst poisons. The improved steric access to the catalyst poisons through complete or partial splitting of most the triglycerides allows the remaining catalyst poison 150 to be efficiently removed from the recycle stream 155 through utilization of known processes such as ion exchange (depicted), activated carbon, solvent extraction, centrifugation, chromatography, electrodeionization, zeolites, etc. in a relatively small scale step while enabling the complete recycle of triglyceride and FFA back to the stream fed to the bottom of the hydrolysis reactor for high conversion of the triglyceride feedstock to renewable diesel. This second catalyst poison removal step—enhanced by the elimination of steric hindrance around the catalyst poisons accomplished in the reactor chamber—achieves removal of at least 70% of the portion of catalyst poisons introduced to this second catalyst poison removal step, for example, at least 80% of the catalyst poisons introduced to this second catalyst poison removal step.

In particular, the subcritical conditions and long residence time of the hydrolysis step result in extremely efficient conversion; for instance, the FFA conversion may be above 95% of theoretical and the glycerol conversion may also be above 95% of theoretical. This has several key advantages: the high FFA conversions improve throughput in subsequent production steps, while the glycerol is itself a valuable by-product, and the non-toxicity status of the glycerol by-product stream means that disposal concerns are limited to small concentrations of catalyst poisons (e.g.—sulfur, nitrogen, phosphorous and metals) present in the aqueous glycerol solution; water and glycerol are later distilled overhead in multiple steps within the glycerol refining section 145, allowing the water to be recycled back into the counter-current hydrolysis reactor (e.g., for reuse in the hydrolysis reaction 125) via a treatment stage and the glycerol is isolated as a product 160, respectively.

Subsequent to the hydrolysis step 125 and distillation of the FFA 135, the resulting high-purity FFA intermediate feedstock may then be subjected to a hydrotreatment or hydrogenation reaction 130 utilizing a metallic catalyst (generally a mixture of molybdenum with aluminum, nickel, or cobalt) and hydrogen stream 115 to produce the final product of renewable diesel and naphtha 140. In contrast with conventional hydrotreatment of triglycerides, the FFA feedstock produced by the hydrolysis process allows the use of a high-pressure (300-1000 psig), low-temperature (200° C.-350° C.) hydrogenation reaction 130 with a reduction of the decarboxylation reaction relative to the hydrogenation reaction. The partial pressure of the hydrogen is in the range of 150 psig to 800 psig, and the overall liquid hourly space velocity is between 0.5 $hr^{-1}$ to 2 $hr^{-1}$.1

Advantageously, by eschewing competing decarboxylation reaction in favor of a liquid-phases catalytic hydrogenation, the hydrotreatment leads to an increased yield of long-chain, saturated hydrocarbons (e.g.—more $C_{18}$ paraffins relative to $C_{17}$) as the FFAs retain the carbon of the carboxyl group as opposed to splitting it into $C_1$ or $CO_2$. For example, the step of hydrotreating the purified intermediate feedstock may produce a combined carbon dioxide yield of not more than 80% of a combined carbon dioxide yield as would be produced in a hydrotreating step when feeding a triglyceride feedstock that was pretreated with bleaching earth into otherwise similar equipment. Also, for example, the renewable diesel product may comprise at least 20% more even numbered straight-chain alkanes of length C14 or greater than would be present in a product produced when feeding a triglyceride feedstock that was pretreated with bleaching earth into otherwise similar equipment. The conversion of more than 95% of the triglyceride to FFAs also substantially reduces the production of propane and other low-value, short-chain hydrocarbons, which reduces the size—and therefore cost—of equipment necessary to separate and dispose of them. For example, the reaction chamber of the hydrotreater may be smaller in size than an otherwise similar reaction chamber as would be required when feeding triglyceride feedstock pretreated with bleaching earth.

Still further, the combination of lack of catalyst poisons due to the initial simultaneous hydrolysis and liquid-liquid extraction step in the reaction chamber and subsequent distillation plus the reduced reaction temperatures during hydrotreatment enables less catalyst coking and fouling. In an embodiment, the intermediate FFA feedstock comprises less than 2 parts per million by weight ("ppmw") phosphorous, 20 ppmw sulfur and 30 ppmw nitrogen.

In addition to the economic benefits listed above, the FFA feedstock enables substantially lower (in the range of 15-25%) hydrogen consumption despite the high partial pressure. For example, the hydrogen stream may comprise a throughput volume of not more than 80% of a hydrogen throughput volume as would be consumed when feeding a triglyceride feedstock that was pretreated with bleaching earth into otherwise similar equipment operating under otherwise similar conditions, for example, with the same catalyst at the same temperature and pressure. As $H_2$ production equipment represents a significant contributor to the capital and operating expense of most renewable diesel production processes, this enables significant operational flexibility compared to prior art renewable diesel processes, as the process can be optimized either for maximum economy (e.g.—lower capital and operating expense) or maximum hydrocarbon production capacity. The use of an FFA feedstock also enable the hydrotreatment step to be accomplished with standard hydrotreatment equipment, e.g., a catalytic hydrogenation reactor, catalytic isomerization reactor, and fractionation and refining equipment.

Figure 3:
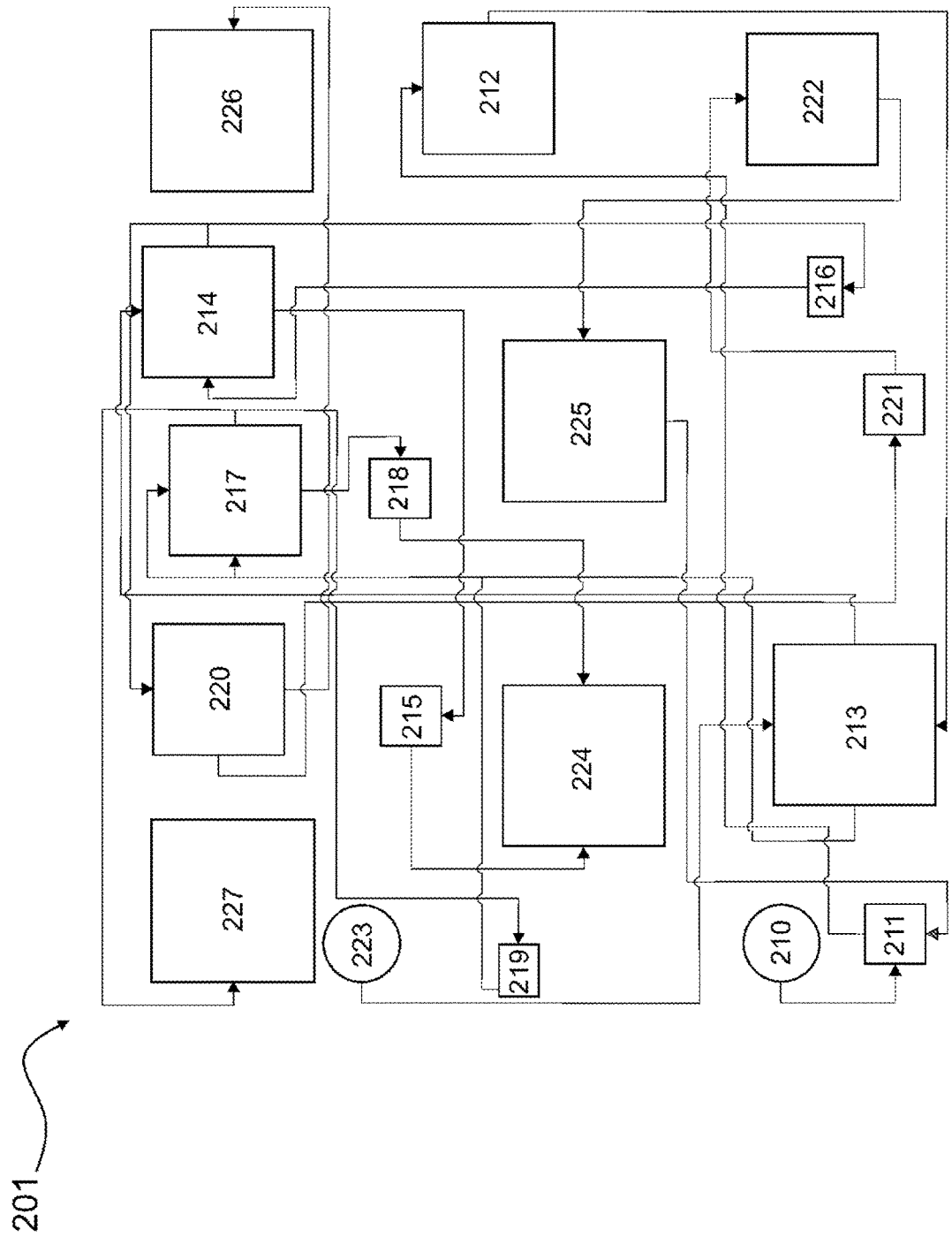
FIG. 3 depicts another, more detailed embodiment of the novel process disclosed herein.

Turning to FIG. 3, an alternative embodiment 201 is illustrated with the various flow paths in greater detail. Tallow feed 210 goes to the preheater 211, and then flash distillation 212, and then hydrolysis reactor 213, for example, which may be a counter-current hydrolysis reactor of the type and/or configuration as disclosed herein, which is provided hydrogen and hydroxy groups via RO water 223 (although not depicted in this embodiment, the water may also be recycled from storage 224 similar to the embodiment in FIG. 2). The hydrolysis reactor 213 feeds the aqueous fraction into the sweet water flash distiller 217 and the FFAs into the FFA flash distiller 214.

The sweet water flash distiller 217 further distills the glycerol which is taken to storage 227 while the water stream is recycled through a condenser 218 and taken to water storage 224. The sweet water cycle is additionally fed through a heater 219.

The flash distiller 214 (also cycled through heater 216) in turn generates a feed of wastewater which is fed to a condenser 215 and into process water storage 224. A second feed from FFA flash distiller 214 is conveyed to fractionation 220. Fractionation 220 in turn generates a bottom recycle stream of pitch which is conveyed to flash distiller 222 via heater 221 and then to pitch storage 225, where it may be optionally recycled into the tallow feed via preheater 211. The top stream of the fractionation 220 is the final FFA product 226, which is the feedstock to the renewable diesel process.

Although several preferred embodiments have been illustrated in the accompanying drawings and described in the foregoing specification, it will be understood by those of skill in the art that additional embodiments, modifications and alterations may be constructed from the principles disclosed herein, while still falling within the scope of the disclosed subject matter.

What is claimed is:

1. A system for producing a renewable fuel comprising C10-C18 alkanes, the system comprising:
   a first reaction chamber configured to:
      receive a primary feedstock and up to 50% water under counter-current flow conditions, the primary feedstock comprising biologically-derived triglycerides and catalyst poisons;
      hydrolyze the primary feedstock for at least an hour to form a hydrolysis effluent comprising (i) an aqueous solution comprising glycerol and a first portion of the catalyst poisons and (ii) an intermediate feedstock comprising free fatty acids and a second portion of the catalyst poisons, wherein the first reaction chamber is maintained at a temperature between 250° C. and 270° C. and a pressure between 700 psig and 900 psig; and
      separate the intermediate feedstock and the aqueous solution;
   a distillation column configured to:
      receive the intermediate feedstock; and
      distill the intermediate feedstock at an absolute pressure under 700 mm Hg to obtain a purified intermediate feedstock comprising free fatty acids and a bottom stream containing unreacted triglycerides, diglyceride, monoglyceride, free fatty acids, and at least a portion of the second portion of the catalyst poisons;
   a second reaction chamber comprising a metallic catalyst and configured to hydrotreat the purified intermediate feedstock by contacting the purified intermediate feedstock with hydrogen to produce the renewable fuel comprising C10-C18 alkanes, wherein the hydrotreating is carried out at a temperature between 200° C. and 350° C. and a pressure between 300 and 1000 psig;
   a purification unit configured to:
      remove the at least the portion of the second portion of the catalyst poisons from the bottom stream to form a recycle stream containing unreacted triglycerides, diglyceride, monoglyceride, and free fatty acids; and
      direct the recycle stream to the first reaction chamber.

2. The system of claim 1, wherein, while hydrolyzing the triglycerides, the first reaction chamber is configured to be maintained under conditions sufficient to yield liquid-liquid extraction of the first portion of the catalyst poisons into the aqueous solution.

3. The system of claim 2, wherein the first reaction chamber comprises internal components effective to yield a contacting surface area per volume of the first reaction chamber of not less than about 150 $m^2/m^3$.

4. The system of claim 2, wherein the first reaction chamber comprises internal components effective to yield a contacting surface area per volume of the first reaction chamber of not less than about 200 $m^2/m^3$.

5. The system of claim 2, wherein the first reaction chamber comprises internal components effective to yield a contacting surface area per volume of the first reaction chamber of not less than about 250 $m^2/m^3$.

6. The system of claim 2, wherein the first reaction chamber comprises internal components effective to yield at least about 93% voidage.

7. The system of claim 2, wherein the first reaction chamber comprises internal components effective to yield at least about 95% voidage.

8. The system of claim 2, wherein the first reaction chamber comprises a plurality of stages.

9. The system of claim 2, wherein the first reaction chamber comprises at least 4 stages.

10. The system of claim 1, wherein the first reaction chamber is configured to hydrolyze the primary feedstock to produce a glycerol yield at least 95% of theoretical glycerol yield.

11. The system of claim 1, further comprising a glycerol refinement stage.

12. The system of claim 11, wherein the glycerol refinement stage is configured to:
   separate the aqueous solution into a glycerol stream and water; and
   return the water back into the first reaction chamber.

13. The system of claim 12, wherein the glycerol refinement stage is configured to separate the aqueous solution into the glycerol stream and water by distillation.

14. The system of claim 1, wherein the metallic catalyst comprises molybdenum, aluminum, nickel, cobalt, or a combination thereof.

15. The system of claim 1, wherein the second reaction chamber is configured to hydrotreat the purified intermediate feedstock to produce a combined carbon dioxide yield of no more than 80% of a combined carbon dioxide yield than would be produced in the same reaction chamber during a hydrotreatment except with a triglyceride feedstock that was pretreated with bleaching earth.

16. The system of claim 1, wherein the second reaction chamber is configured to receive the hydrogen at a throughput volume of no more than 80% of a hydrogen throughput volume than would be consumed in the same reaction chamber during hydrotreatment except with a triglyceride feedstock that was pretreated with bleaching earth.

17. The system of claim 1, wherein the intermediate feedstock comprises less than 2 parts per million by weight ("ppmw") phosphorous, 20 ppmw sulfur, and 30 ppmw nitrogen.

18. The system of claim 1, wherein the renewable fuel comprising C10-C18 alkanes comprises at least 20% more even numbered straight-chain alkanes of length C14 or greater than would be produced in the same reaction chamber during hydrotreatment except with a triglyceride feedstock that was pretreated with bleaching earth.

19. The system of claim 1, wherein the second reaction chamber is smaller in size than a reaction chamber as would be required to operate the same hydrotreating step except with a triglyceride feedstock pretreated with bleaching earth.

20. The system of claim 1, wherein purification unit is configured to remove at least the portion of the second portion of the catalyst poisons from the bottom stream by subjecting the bottom stream to ion exchange, activated carbon, solvent extraction, centrifugation, chromatography, electrodeionization, zeolite, or combinations thereof.

* * * * *